US008606505B2

(12) United States Patent
Takeuchi

(10) Patent No.: US 8,606,505 B2
(45) Date of Patent: Dec. 10, 2013

(54) TRAVEL GUIDANCE SYSTEM, TRAVEL GUIDANCE DEVICE, TRAVEL GUIDANCE METHOD, AND COMPUTER PROGRAM

(75) Inventor: Masashi Takeuchi, Kitahiroshima (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/428,884

(22) Filed: Mar. 23, 2012

(65) Prior Publication Data

US 2012/0310521 A1 Dec. 6, 2012

(30) Foreign Application Priority Data

May 30, 2011 (JP) ................................. 2011-119949

(51) Int. Cl.
 *G01C 21/00* (2006.01)
 *G01C 21/34* (2006.01)
(52) U.S. Cl.
 USPC ........................................................ 701/408
(58) Field of Classification Search
 USPC ......... 701/408, 410, 411, 420, 465, 468, 201,
 701/210, 412
 See application file for complete search history.

(56) References Cited

U.S. PATENT DOCUMENTS

| 5,463,553 | A | * | 10/1995 | Araki et al. | .................... | 701/454 |
| 2004/0148094 | A1 | * | 7/2004 | Katou | ............................ | 701/201 |
| 2004/0172189 | A1 | * | 9/2004 | Maeda | ........................... | 701/200 |
| 2008/0275636 | A1 | * | 11/2008 | Hirose | ............................ | 701/201 |

FOREIGN PATENT DOCUMENTS

JP A 2005-030864 2/2005

* cited by examiner

*Primary Examiner* — Mary Cheung
*Assistant Examiner* — Rodney Butler
(74) *Attorney, Agent, or Firm* — Oliff & Berridge, PLC

(57) ABSTRACT

Travel guidance systems, devices, methods, and programs set a route from a departure point toward destination and acquire a position of a movable body along the route. The guidance systems, devices, methods, and programs determine whether the movable body has arrived at the destination by acquiring a distance from an end of the set route to the destination. When the acquired distance is less than a predetermined distance, the determination is based on the end of the route. When the acquired distance is equal to or more than the predetermined distance and the destination is a specific point, the determination is based on the end of the route. When the acquired distance is equal to or more than the predetermined distance and the destination is a point that is not a specific point, the determination is based on a position of the destination.

13 Claims, 5 Drawing Sheets

FIG.2

POINT INFORMATION

| POINT NAME | GENRE | POSITIONAL COORDINATE | SPECIFIC FACILITY |
|---|---|---|---|
| XX ZOO | ZOO AND BOTANICAL GARDENS | X1、Y1 | × |
| XY PARK | AMUSEMENT PARK | X2、Y2 | ○ |
| ZZ RESTAURANT | RESTAURANT | X3、Y3 | ---- |
| YY SA | SA・PA | X4、Y4 | ○ |
| YX HOSPITAL | GENERAL HOSPITAL | X5、Y5 | ---- |
| ... | ... | ... | ... |

TRAVEL GUIDANCE SYSTEM, TRAVEL GUIDANCE DEVICE, TRAVEL GUIDANCE METHOD, AND COMPUTER PROGRAM

INCORPORATION BY REFERENCE

The disclosure of Japanese Patent Application No. 2011-119949, filed on May 30, 2011, including the specification, drawings, and abstract thereof, is incorporated herein by reference in its entirety.

BACKGROUND

1. Related Technical Fields

Related technical fields include travel guidance systems, travel guidance devices, travel guidance methods, and computer programs that set a route from a departure point to a destination as well as perform arrival determination with respect to a destination based on the set route.

2. Related Art

In recent years, many vehicles are mounted with navigation devices that are capable of guiding a driver to easily arrive at a desired destination by providing travel guidance of the vehicle. Here, the navigation devices are devices that can detect a current position of the vehicle via a GPS receiver or the like, acquire map data corresponding to the current position through a recording medium such as a DVD-ROM, a HDD, and the like, and display the data on a liquid crystal monitor. The devices enable the driver to recognize at a glance the point where the vehicle currently travels, by reading out the map data including the current position of the vehicle from the recording medium or the like, drawing a map image of the vicinity of the current position of the vehicle based on the map data to display on a display device, displaying a vehicle position mark to be superimposed on the map image, scrolling the map image according to the movement of the vehicle, and moving the vehicle position mark with the map image being fixed on the screen. In addition, the aforementioned navigation devices include a route search function that, upon setting a desired destination, calculates the most appropriate route from a departure point (for example, the current position of the vehicle) to the set destination, and also a travel guidance function that performs travel guidance along the calculated route. In recent years, some cellular phones, PDAs (Personal Digital Assistant), personal computers, and the like have the same function as the aforementioned navigation devices.

In the aforementioned navigation devices or the like, when the vehicle travels along the set route, whether the vehicle has arrived at the destination is determined. If it has been determined that the vehicle has arrived at the destination, the processing to inform the user that the vehicle has arrived at the destination and to cancel the set destination and route is performed.

The arrival determination with respect to the destination is generally performed based on an end of the set route. Specifically, in a case in which the vehicle is located on the route and has arrived within a predetermined distance (for example, 30 m) from the coordinate of the end of the route, it is determined that the vehicle has arrived at the destination.

However, if the destination has been set especially to a large facility with a huge site area (for example, a theme park, an outlet mall, or the like), the end of the route can be far from the destination. In such case, if the arrival is determined based on the end of the route, the travel guidance terminates at a position far from the destination, which may not allow the user to arrive at the destination. Therefore, if the destination between the end of the route and the destination is equal to or more than a predetermined distance, the arrival at the destination is determined based on the position of the destination instead of the end of the set route, as recited in Japanese Patent Application; Publication No. 2005-30864. Specifically, if the vehicle has arrived within a predetermined distance (for example, 200 m) from the positional coordinate of the destination, it is determined that the vehicle has arrived at the destination.

SUMMARY

However, if the arrival at the destination is determined based on the position of the destination, as the technology described in Japanese Patent Application; Publication No. 2005-30864, the following problem arises.

For example, if a large facility 101 is set as the destination as shown in FIG. 8, it is determined that a vehicle 102 has arrived at the destination when the vehicle 102 has arrived within a predetermined distance L (For example, 200 m) from a positional coordinate A of the destination. However, if the vehicle 102 travels along a set route 103, it is determined that the vehicle 102 has arrived at the destination when the vehicle 102 has arrived at a point B and the guidance terminates. As a result, the vehicle 102 cannot determine the direction to proceed at the next intersection 104.

Exemplary implementations of the broad inventive principles described herein provide a travel guidance system, a travel guidance device, a travel guidance method, and a computer program that are capable of correctly determining whether the vehicle has arrived at the destination independently of the size of the destination and the road shape in the vicinity and appropriately guiding the vehicle to the destination.

Exemplary implementations provide a travel guidance device or system (1) that includes: a route setting unit (13) that sets a route (52) from a departure point to a destination (51); a movable body position acquiring unit (13) that acquires a position of a movable body (53) moving along the route; an arrival determining unit (13) that determines whether the movable body has arrived at the destination, based on the position of the movable body acquired by the movable body position acquiring unit; an away-distance acquiring unit (13) that acquires an away-distance from an end of the route set by the route setting unit to the destination, wherein the arrival determining unit, if the away-distance is less than a predetermined distance, or if the away-distance is equal to or more than the predetermined distance and the destination is a specific point, determines based on the end of the route whether the movable body has arrived at the destination, and if the away-distance is equal to or more than the predetermined distance and the destination is a point that is not the specific point, determines based on a position of the destination whether the movable body has arrived at the destination.

According to exemplary implementations, if the movable body is able to arrive at the destination (51) without travel guidance from the end of the route (52) to the destination being provided to the movable body, the point of the destination is set as the specific point.

According to exemplary implementations, the travel guidance system includes an identifying information acquiring unit (13) that acquires identifying information identifying whether a point set as the destination (51) is the specific point, wherein the arrival determining unit determines using the identifying information whether the movable body (53) has arrived at the destination.

According to exemplary implementations, the arrival determining unit (13), when determining based on the end of the route (52) whether the movable body (53) has arrived at the destination (51), determines that the movable body has arrived at the destination if the movable body is located on the route and within a first determination reference distance from a coordinate of the end of the route, and when determining based on a position of the destination whether the movable body has arrived at the destination, determines that the movable body has arrived at the destination if the movable body is located within a second determination reference distance from a positional coordinate of the destination.

Exemplary implementations provide a method that includes: setting a route (52) from a departure point to a destination (51); acquiring a position of a movable body (53) moving along the route; determining whether the movable body has arrived at the destination, based on the position of the movable body acquired at the movable body position acquiring step; acquiring an away-distance from an end of the route set at the route setting step to the destination, wherein at the arrival determining step, if the away-distance is less than a predetermined distance, or if the away-distance is equal to or more than the predetermined distance and the destination is a specific point, it is determined based on the end of the route whether the movable body has arrived at the destination, and if the away-distance is equal to or more than the predetermined distance and the destination is a point that is not the specific point, it is determined based on a position of the destination whether the movable body has arrived at the destination.

Exemplary implementations provide a computer program (32) that causes a computer to execute the functions of: setting a route (52) from a departure point to a destination (51); acquiring a position of a movable body (53) moving along the route; determining whether the movable body has arrived at the destination, based on the position of the movable body acquired by the movable body position acquiring function; acquiring an away-distance from an end of the route set by the route setting function to the destination, wherein the arrival determining function, if the away-distance is less than a predetermined distance, or if the away-distance is equal to or more than the predetermined distance and the destination is a specific point, determines based on the end of the route whether the movable body has arrived at the destination, and if the away-distance is equal to or more than the predetermined distance and the destination is a point that is not the specific point, determines based on a position of the destination whether the movable body has arrived at the destination.

According to exemplary implementations, it is possible to appropriately set the determination reference for determining whether the movable body has arrived at the destination to either the position of the destination or the end of the route. As a result, independently of the size of the destination and the road shape in the vicinity, it is possible to properly determine whether the movable body has arrived at the destination, thereby making it possible to appropriately guide the movable body to the destination without terminating the guidance when the travel guidance to the destination is necessary.

According to exemplary implementations, even when the destination is a large facility or the like and the end of the route is far from the destination, if the movable body can arrive at the destination without the travel guidance from the end of the route to the destination being provided to the movable body, the determination reference for an arrival at the destination is set to the end of the route instead of the position of the destination. Therefore, while the travel guidance from the position of the movable body to the destination is necessary, it is not mis-determined that the movable body has arrived at the destination. In addition, even if the guidance terminates when the movable body has arrived at the end of the route before approaching the destination, the vehicle can easily travel to the destination.

According to exemplary implementations, it is determined based on the acquired identifying information whether the point set as the destination is a specific point. Therefore, it is possible to easily and properly identify whether the point set as the destination is the specific point.

According to exemplary implementations, it is possible to appropriately determine based on the distance from the movable body to the position of the destination or the distance from the movable body to the end of the route whether the movable body has arrived at the destination. As a result, independently of the size of the destination and the road shape in the vicinity, it is possible to properly determine whether the movable body has arrived at the destination.

BRIEF DESCRIPTION OF THE DRAWINGS

FIG. 2 shows an example of point information stored in a map information

DETAILED DESCRIPTION OF EXEMPLARY IMPLEMENTATIONS

Figure 1:
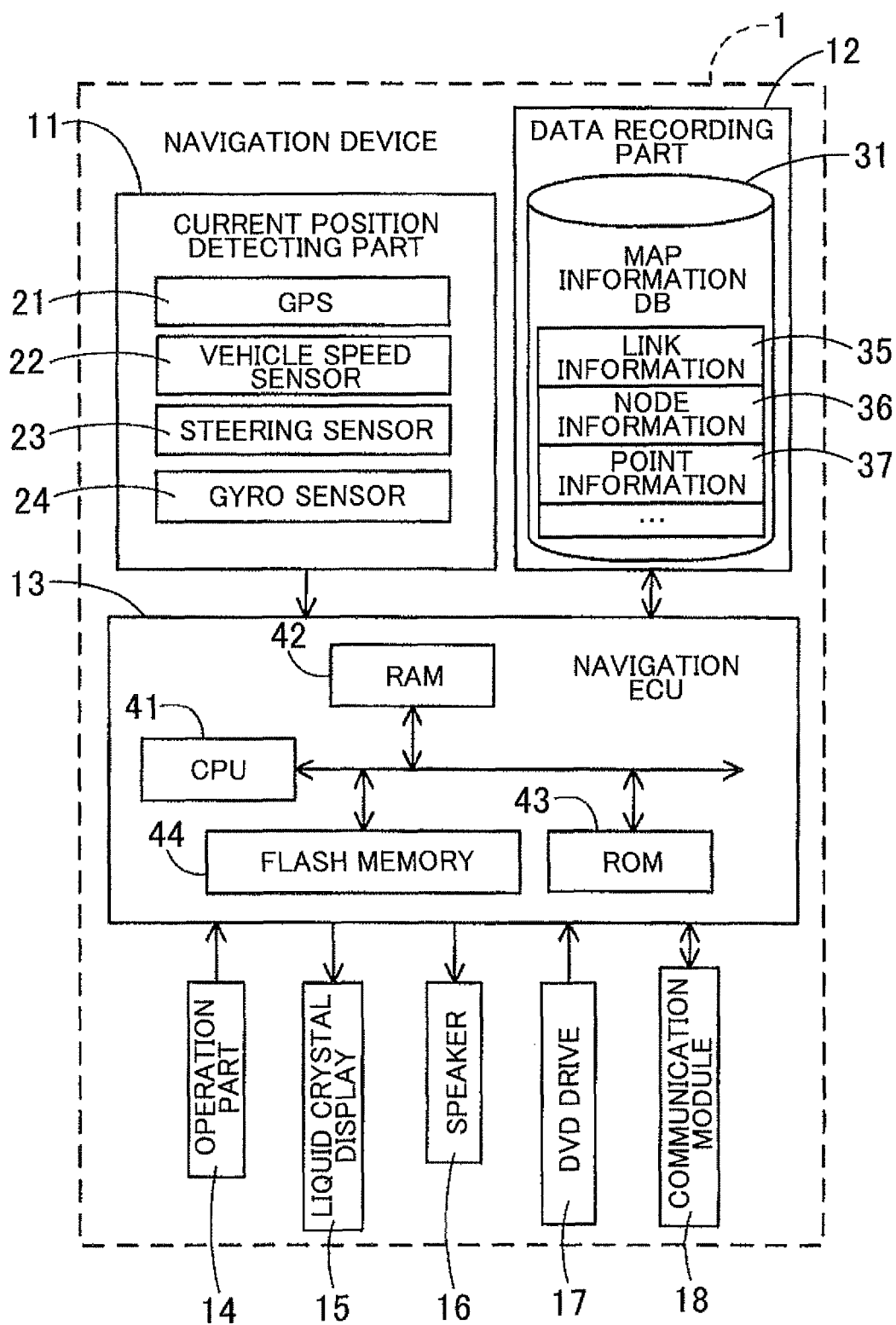
FIG. 1 is a block diagram showing a navigation device according to the present example.

Hereinafter, a specific example of a travel guidance system and a travel guidance device that are implemented in a navigation device will be explained in detail with reference to the drawings. First, a schematic structure of a navigation device 1 will be explained with reference to FIG. 1. FIG. 1 is a block diagram showing the navigation device 1 according to the present example.

As shown in FIG. 1, the navigation device 1 according to the present example is composed of a current position detecting part 11 that detects a current position of a vehicle mounted with the navigation device 1; a data recording part 12 in which various kinds of data is recorded; a controller (e.g., navigation ECU 13) that performs various kinds of arithmetic processing based on input information; an operation part 14 that accepts an operation of a user; a liquid crystal display 15 that displays a map of the vicinity of the vehicle and facility information regarding facilities to the user; a speaker 16 that outputs audio guidance regarding route guidance; a DVD drive 17 that reads out a DVD serving as a storage medium; a communication module 18 that performs communication with information centers such as a probe center, a VICS® (Vehicle Information and Communication System) center, and the like.

Hereinafter, the respective components composing the navigation device 1 are explained.

The current position detecting part 11 includes at least one of a GPS 21, a vehicle speed sensor 22, a steering sensor 23, a gyro sensor 24, and the like, and can detect a current position and a bearing of the vehicle, a traveling speed of the vehicle, a current time, and the like. Here, in particular, the vehicle speed sensor 22 is a sensor for detecting a moving distance and a speed of the vehicle, generates pulses in accordance with a rotation of drive wheels of the vehicle, and outputs pulse signals to the navigation ECU 13. Subsequently, by counting the number of generated pulses, the navigation ECU 13 calculates a rotation speed of the drive wheels and the moving distance. Note that the navigation device 1 is not required to be provided with all the aforementioned four kinds of sensors, and the navigation device 1 may be provided with only one or a plurality of kinds of sensors among them.

The data recording part 12 is provided with a hard disk (not shown) serving as an external storage medium and a recording medium, and a recording head (not shown) serving as a driver for reading a map information DB 31, a predetermined program, and the like, which are recorded in the hard disk, and writing predetermined data in the hard disk. The data recording part 12 may be composed of a memory card, or an optical disk such as a CD, a DVD, and the like, in place of the hard disk.

The map information DB 31 is a storage unit storing, for example, link information 35 regarding roads (links), node information 36 regarding node points, point information 37 regarding points of facilities and the like, map display information for displaying a map, intersection information regarding intersections, route search information for searching for routes, point search information for searching for points, and the like.

Here, as the point information 37, information regarding points of the facilities and the like serving as a departure point, a destination, a guidance target in the navigation device 1 is stored. For example, the information regarding accommodation facilities such as hotels and the like, gas filing stations such as gas stations and the like, commercial facilities such as malls, supermarkets, shopping centers, and the like, amusement facilities such as theme parks, arcades, and the like, eating and drinking establishments such as restaurants, bars, and the like, and parking facilities such as public parking lots and the like, traffic facilities, religious facilities such as temples, churches, and the like, public facilities such as galleries, museums, and the like are included as the point information 37. In addition, in the navigation device 1 according to the present example, identifying information identifying whether each point is a specific point is stored as the point information 37. The specific point here is a point where, if the specific point is set as the destination, a vehicle is able to arrive without the navigation device 1 providing the vehicle with travel guidance from the end of the guidance route to the destination set in the navigation device 1 even when the distance from the end of the guidance route to the destination is long. The cases in which the vehicle is able to arrive without the navigation device 1 providing the vehicle with travel guidance from the end of the guidance route to the destination include, for example, a case in which there is only one road without branches from the end of the guidance route to the destination, a case in which there are sign posts clearly indicating the route from the end of the guidance route to the destination, and the like. The specific point corresponds to a part of facilities such as service areas, parking areas, theme parks, outlet malls, and the like, for example.

Here, FIG. 2 shows an example of the point information 37 stored in the map information DB 31. As shown in FIG. 2, the point information 37 is composed of a point name, a genre that the point belongs to, a positional coordinate where the point is located, and identifying information showing whether the point is a specific facility. For example, in the example shown in FIG. 2, "XX zoo" belongs to the genre of zoo and botanical gardens, is located at a coordinate (X1,Y1), and does not correspond to the specific facility. In addition, "XY park" belongs to the genre of amusement park, is located at (X2, Y2), and corresponds to the specific facility. In the same manner, the map information DB 31 stores information regarding other points. In FIG. 2, regarding the points (common facilities with non-huge site area) for which there is no possibility that the distance from the end of the guidance route to the destination set in the navigation device 1 is long, the identifying information is not stored. However, the identifying information may be stored for all points.

The navigation ECU (electric control unit) 13 sets a determination reference for determining whether the vehicle has arrived at the destination, based on the point information 37 of the point being set as the destination in the navigation device 1, as described later.

On the other hand, the navigation ECU 13 is an electronic control unit that performs overall control of the navigation device 1. The navigation ECU 13 is provided with: a CPU 41 serving as a computing device and a control device; internal storage mediums such as a RAM 42 used as a working memory when the CPU 41 executes various computing processing and in which route data when the route has been calculated, and the like, are stored, a ROM 43 which records a program for control, and a route search processing program (refer to FIG. 3), a destination arrival determination processing program (refer to FIG. 7) described later, and a flash memory 44 which records a program read from the ROM 43; and the like. (Note: the term "storage medium" as used herein is not intended to encompass transitory signals.) In addition, the navigation ECU 13 functions as various kinds of units serving as processing algorithms. For example, a route setting unit sets a guidance route from a departure point (for example, a current position of a vehicle) to a destination for providing guidance for movement of the vehicle (a movable body). A movable body position acquiring unit acquires the position of the vehicle moving along the route. An arrival determining unit determines whether the vehicle has arrived at the destination, based on the acquired position of the vehicle. An away-distance acquiring unit acquires an away-distance from the end of the guidance route set by the route setting unit to the destination. An identifying information acquiring unit acquires identifying information identifying whether the point set as the destination is the specific point.

The operation part 14 is operated for inputting a departure point as a travel starting point or a destination as a travel ending point, and is composed of various keys and a plurality of operation switches (not shown) such as buttons and the like. The navigation ECU 13 performs control so as to execute the corresponding kinds of operations based on switch signals outputted through pressing the respective switches and the like. The operation part 14 may be composed of a touch panel installed in front of the liquid crystal display 15. The operation part 14 may be composed of a microphone and a voice recognition device.

On the liquid crystal display 15, a map image including roads, traffic information, operation guidance, an operation menu, key guidance, a guidance route from a departure point to a destination, guidance information along the guidance route, news, weather forecast, time, E-mail, TV programs, and the like are displayed.

The speaker 16 outputs audio guidance for traveling the guidance route based on an instruction from the navigation ECU 13, and the traffic information. In addition, when a guidance route is being set in the navigation device 1, if it has been determined that the vehicle has arrived at the destination, the speaker 16 outputs audio guidance informing that the vehicle has arrived at the destination.

The DVD drive 17 is a drive capable of reading data stored in the recording medium such as a DVD, a CD, and the like. The DVD drive 17 plays music and images, updates the map information DB 31 based on the read data, and the like.

The communication module 18 is a communication device for receiving the traffic information including congestion information, regulation information, traffic accident information, and the like, which is transmitted from a traffic information center such as a VICS center, a probe center, and the like. The communication module 18 corresponds to a cellular phone and a DCM for example.

Subsequently, a route search processing method will be explained with reference to the algorithm shown in FIG. 3. The process algorithm may be implemented in the form of a computer program that is stored in, for example, the data recording part 12, RAM 45, ROM 43, or flash memory 44 included in the navigation device 1, and executed by the CPU 41. Although the structure of the above-described navigation device 1 is referenced in the description of the process, the reference to such structure is exemplary, and the method need not be limited by the specific structure of the navigation device 1.

Here, the route search processing program is executed when a predetermined operation (for example, a destination setting operation) for performing route search in the navigation device 1 has been received.

First, at Step (hereinafter, referred to as S) 1 of the route search processing program, the CPU 41 sets a departure point and a destination based on the accepted user's operation. The departure point may be the current position of the vehicle.

Next, at S2, the CPU 41 performs search processing for a route from the departure point to the destination set at S1. The route search processing utilizes the known Dikstra method. The CPU 41 calculates cost added values for each of a plurality of search conditions (toll road priority, general road priority, distance priority, and the like) and provides information for a route having the least cost added value under each search condition. For example, the entire image of each route is displayed together with the search condition on the liquid crystal display 15. The CPU 41 may provide guidance for only one route with the least cost added value using one search condition.

Subsequently, at S3, the CPU 41 sets as the guidance route the route selected by the user's operation among the routes provided at S2.

Figure 4:
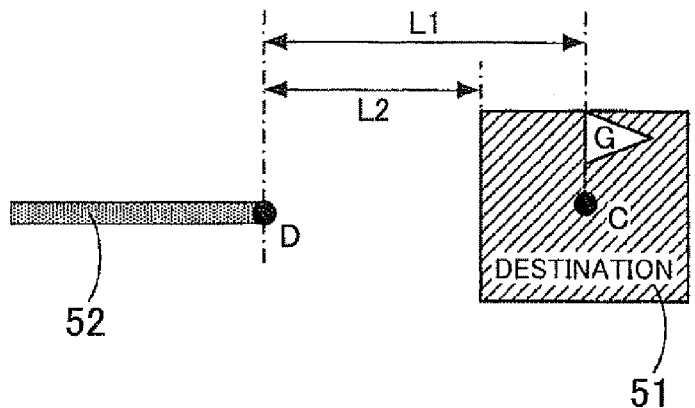
FIG. 4 shows a positional relation between a destination and an end of a guidance route.

Thereafter, at S4, the CPU 41 calculates a distance (hereinafter, referred to as "away-distance") from the end of the guidance route set at S3 to the destination set at S1. Specifically, the CPU 41 calculates the distance between the positional coordinate (refer to FIG. 2) of the point set as the destination and the coordinate of the end of the guidance route as the away-distance. The away-distance may be a direct distance or a road distance along the road. In addition, the away-distance may be a distance L1 from a positional coordinate C of the point set as a destination 51 to an end D of a guidance route 52, or a shortest distance L2 from the border of the facility site set as the destination 51 to the end D of the guidance route 52, as shown in FIG. 4.

Subsequently, at S5, the CPU 41 determines whether the away-distance calculated at S4 is equal to or more than a predetermined distance (for example, 200 m). If it has been determined that the away-distance is less than the predetermined distance (S5: NO), the procedure proceeds to S6. On the other hand, if it has been determined that the away-distance is equal to or more than the predetermined distance (S5: YES), the procedure proceeds to S7.

At S6, the CPU 41 supposes that the vehicle can easily arrive at the destination if the vehicle can be guided to the end of the guidance route and sets the determination reference (hereinafter, referred to as "arrival determination reference") for determining whether the vehicle has arrived at the destination to the end of the guidance route. If the arrival determination reference is set to the end of the guidance route, it is determined that the vehicle 53 has arrived at the destination 51 when the vehicle 53 has arrived within a predetermined distance L3 (a first determination distance, for example, 30 m) from the end D of the guidance route 52. The predetermined distance L3 may be a direct distance from the end D of the guidance route 52 or a distance along the guidance route 52.

At S7, the CPU 41 acquires the identifying information for identifying whether the point is the specific point among the point information 37 of the point set as the destination at S1 from the map information DB 31. The specific point here is a point where, if the specific point is set as the destination as described above, a vehicle is able to arrive without the navigation device 1 providing the vehicle with travel guidance from the end of the guidance route to the destination set in the navigation device 1 even when the distance from the end of the guidance route to the destination is long.

Next, at S8, the CPU 41 determines whether the point set as the destination at S1 is the specific point, based on the identifying information acquired at S7. If it has been determined that the point set as the destination is the specific point (S8: YES), the procedure proceeds to S6. Thereafter, the CPU 41 supposes that the vehicle can easily arrive at the destination if the vehicle can be guided to the end of the guidance route and sets the arrival determination reference to the end of the guidance route, as described above. On the other hand, if it has been determined that the point set as the destination is not the specific point (S8: NO), the procedure proceeds to S9.

Figure 6:
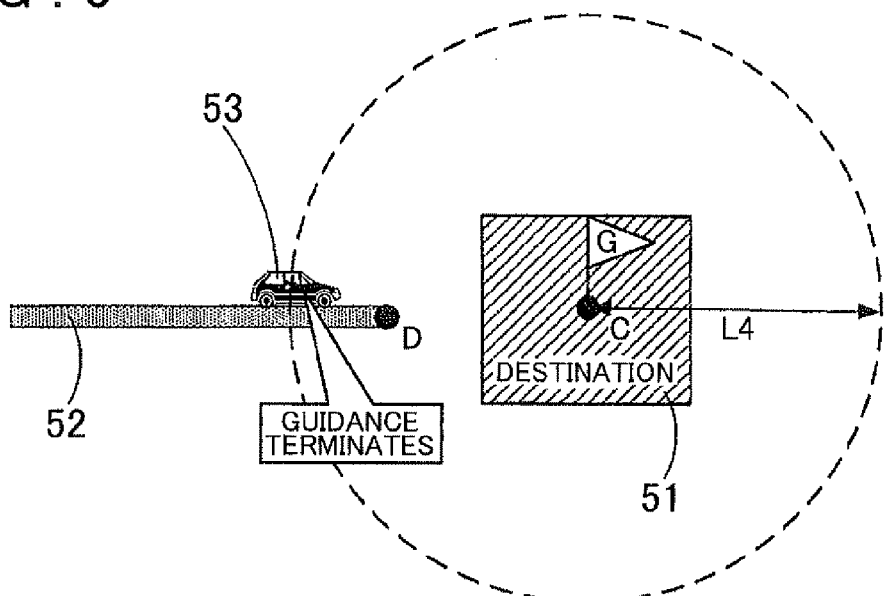
FIG. 6 illustrates a case in which an arrival determination reference is set to a position of the destination.

At S9, the CPU 41 supposes that the vehicle cannot easily arrive at the destination even if the vehicle is guided to the end of the guidance route and sets the arrival determination reference for determining whether the vehicle has arrived at the destination to the position of the destination. If the arrival determination reference has been set to the position of the destination, it is determined that the vehicle 53 has arrived at the destination 51 when the vehicle 53 has arrived within a predetermined distance L4 (a second determination distance, for example, 200 m) from the positional coordinate C of the point set as the destination 51, as shown in FIG. 6.

Figure 7:
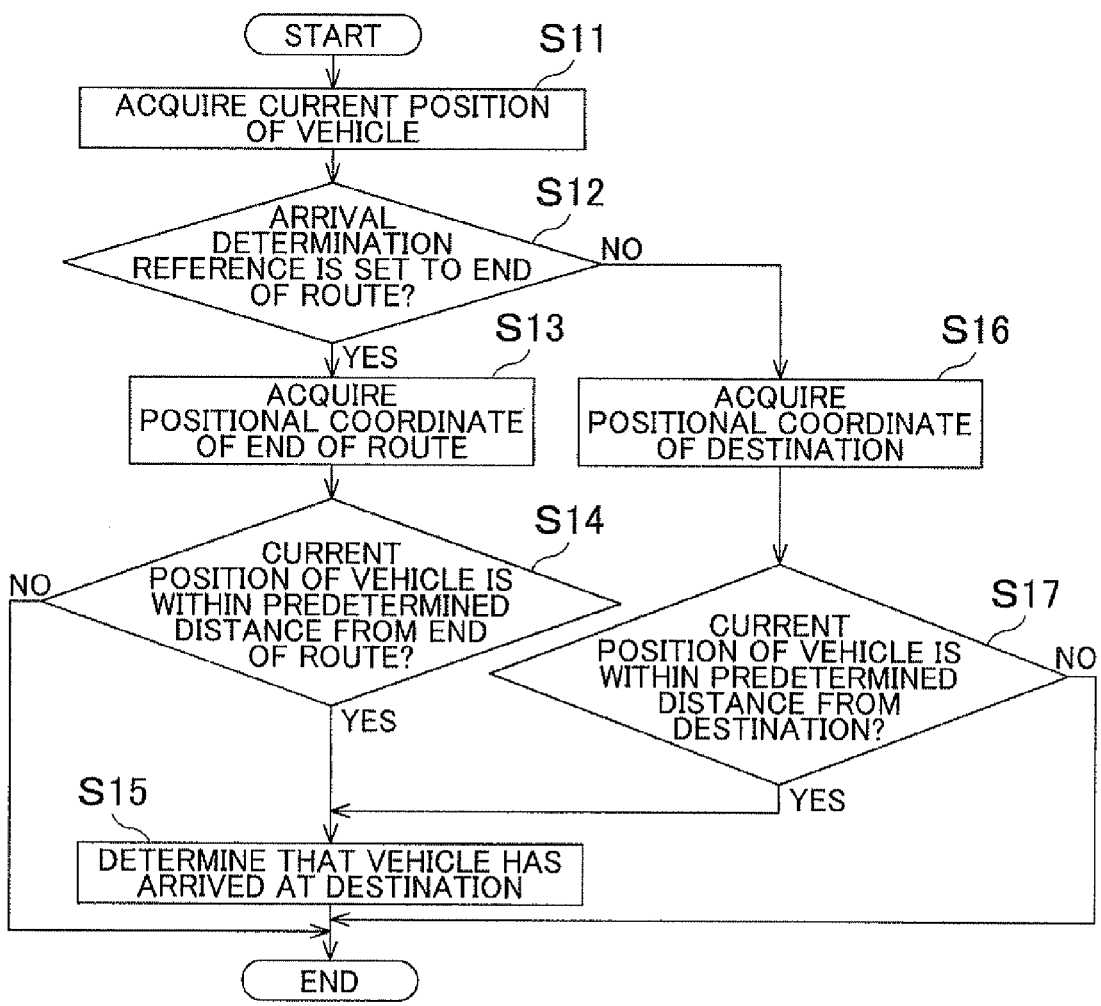
FIG. 7 is a flow chart of a destination arrival determination processing algorithm according to the present example.
Figure 8:
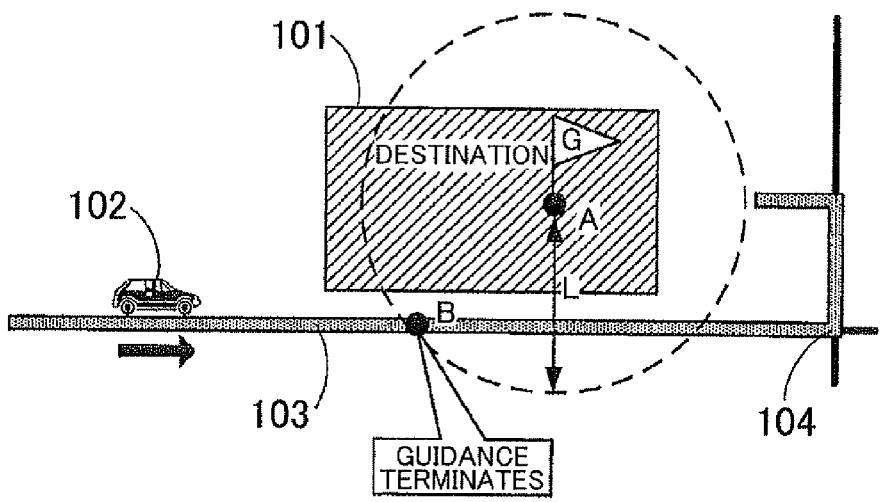
FIG. 8 illustrates a problem in conventional technologies.

Subsequently, a destination determination processing method will be described with reference to the algorithm shown in FIG. 7. The process algorithm may be implemented in the form of a computer program that is stored in, for example, the data recording part 12, RAM 45, ROM 43, or flash memory 44 included in the navigation device 1, and executed by the CPU 41. Although the structure of the above-described navigation device 1 is referenced in the description of the process, the reference to such structure is exemplary, and the method need not be limited by the specific structure of the navigation device 1.

Figure 3:
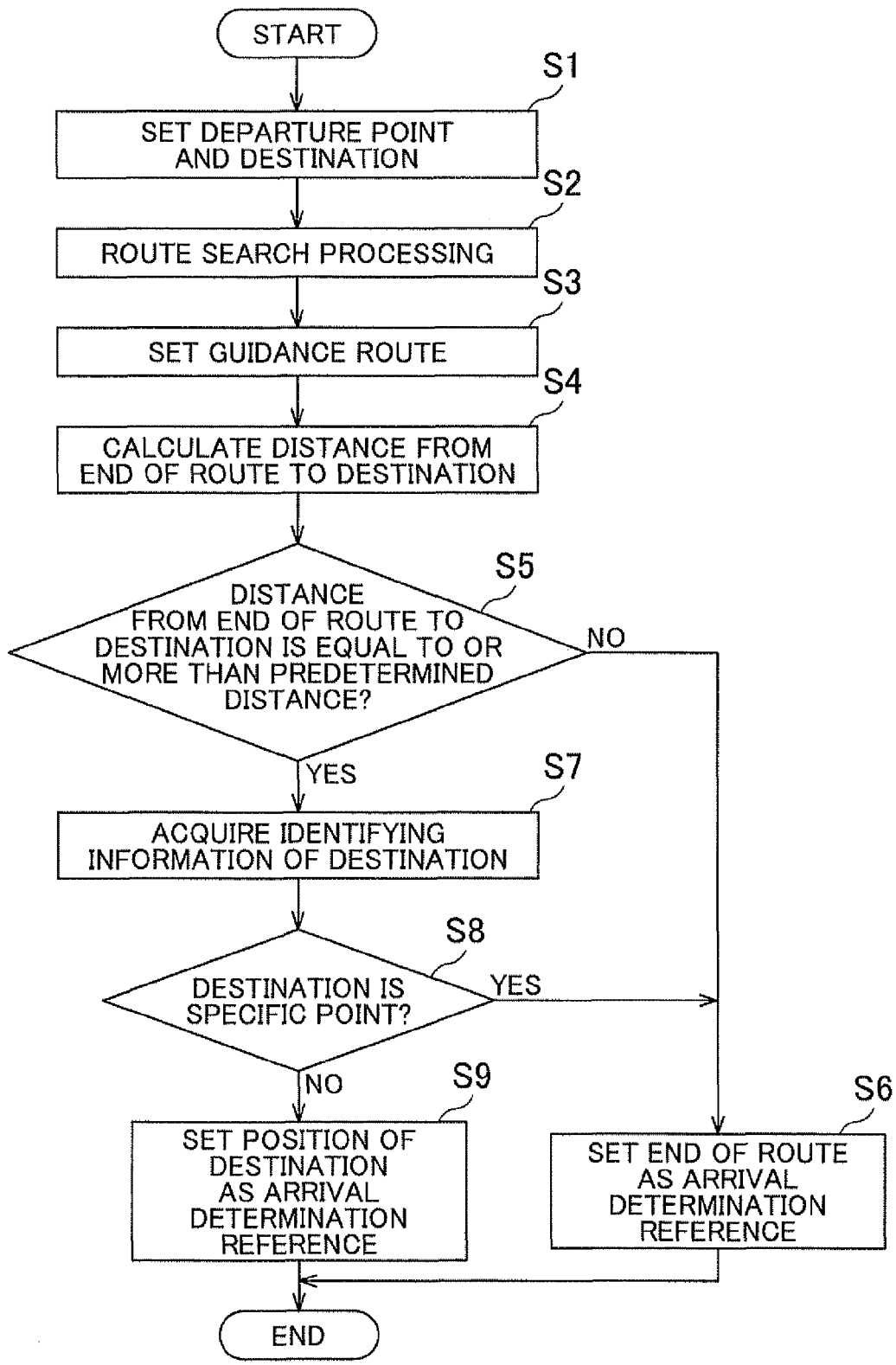
FIG. 3 is a flow chart of a route search processing algorithm according to the present example.

The destination arrival determination processing program is executed at predetermined intervals after a guidance route has been set in the aforementioned route search processing program (refer to FIG. 3). The destination arrival determination processing program is a program to determine whether the vehicle has arrived at the destination.

First, at S11, the CPU 41 acquires the current position of the vehicle based on the detection result of the current position detecting part 11. Also, the CPU 41 performs map-matching processing to determine the current position of the vehicle on the map data. The current position of the vehicle may be accurately determined using a high-accuracy location technology. The high-accuracy location technology is a technology that makes it possible to detect a traveling lane and a highly-accurate vehicle position by detecting information of white lines and road surface paint photographed by a camera installed at a rear side of the vehicle through image recognition and matching the information of white lines and road surface paint with a previously-stored map information DB. The high-accuracy location technology is publicly known; therefore, the explanation is omitted.

Next, at S12, the CPU 41 determines whether the arrival determination reference for determining whether the vehicle has arrived at the destination has been set to the end of the guidance route or the position of the destination (S6, S9) in the aforementioned route search processing program (FIG. 3).

If it has been determined that the arrival determination reference has been set to the end of the guidance route (S12: YES), the procedure proceeds to S13. On the other hand, if the arrival determination reference has been set to the position of the destination (S12: NO), the procedure proceeds to S16.

At S13, the CPU 41 acquires the positional coordinate of the end of the guidance route set at S3.

Figure 5:
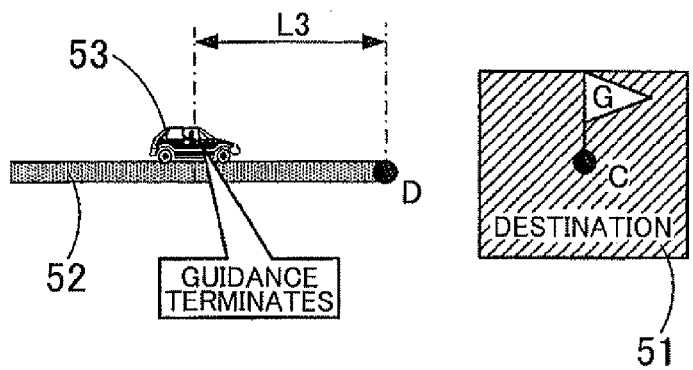
FIG. 5 illustrates a case in which an arrival determination reference is set to the end of the guidance route.

Subsequently, at S14, the CPU 41 determines based on the current position of the vehicle acquired at S11 and the positional coordinate of the end of the guidance route acquired at S13 that the vehicle is located on the guidance route and the current position of the vehicle is within a predetermined distance (the first determination distance, for example, 30 m) from the end of the guidance route (refer to FIG. 5). In the navigation device, if the current position of the vehicle deviates from the guidance route, the guidance route is changed so as to include the current position of the vehicle. Therefore, the vehicle is basically located on the guidance route.

If it has been determined that the vehicle is located on the guidance route and the current position of the vehicle is within the first determination distance from the end of the guidance route (S14: YES), the procedure proceeds to S15. On the other hand, if it has been determined that the vehicle is not located on the guidance route, or the current position of the vehicle is not within the first determination distance from the end of the guidance route (S14: NO), the destination arrival determination processing program terminates.

At S15, the CPU 41 determines that the vehicle has arrived at the destination. If it has been determined that the vehicle has arrived at the destination, the CPU 41 notifies the user that the vehicle has arrived at the destination and cancels the destination and the guidance route set in the navigation device 1. At the same time, the CPU 41 terminates the travel guidance of the navigation device 1 to be performed based on the guidance route.

On the other hand, at S16, the CPU 41 acquires the positional coordinate of the point set as the destination at S1.

Subsequently, at S17, the CPU 41 determines based on the current position of the vehicle acquired at S11 and the positional coordinate of the point set as the destination acquired at S16 whether the current position of the vehicle is within a predetermined distance (the second determination distance, for example, 200 m) from the destination (refer to FIG. 6).

If it has been determined that the current position of the vehicle is within the second determination distance from the destination (S17: YES), the procedure proceeds to S15. Thereafter, the CPU 41 determines that the vehicle has arrived at the destination as described above. On the other hand, if it has been determined that the current position of the vehicle is not within the second determination distance from the destination (S17: NO), the CPU 41 terminates the destination arrival determination processing program.

As explained in detail above, in the navigation device 1 according to the present example, a movement guidance method utilizing the navigation device 1, and a computer program to be executed in the navigation device 1, a guidance route from a departure point to a destination is set (S3); the away-distance from the end of the set guidance route to the destination is acquired (S4); if the away-distance is within a predetermined distance, or if the away-distance is equal to or more than the predetermined distance and the destination is a specific point, it is determined based on the end of the route whether a vehicle (a movable body) has arrived at the destination (S6, S15). If the away-distance is equal to or more than the predetermined distance and the destination is a point that is not a specific point, it is determined based on the position of the destination whether the vehicle has arrived at the destination (S9, S15). Therefore, the determination reference for determining whether the vehicle has arrived at the destination can be appropriately set to either the position of the destination or the end of the route. As a result, independently of the size of the destination and the road shape in the vicinity, it is possible to properly determine whether the movable body has arrived at the destination, thereby making it possible to appropriately guide the movable body to the destination without terminating the guidance when the travel guidance to the destination is necessary.

In addition, even when the destination is a large facility and the distance from the end of the route to the destination is long, if the vehicle can arrive at the destination without the travel guidance from the end of the route to the destination being provided to the vehicle, the determination reference for an arrival at the destination is set to the end of the route instead of the position of the destination (S6). Therefore, while the travel guidance from the position of the vehicle to the destination is necessary, it is not mis-determined that the vehicle has arrived at the destination. In addition, even if the guidance terminates when the vehicle has arrived at the end of the route before approaching the destination, the vehicle can easily travel to the destination.

In addition, it is determined based on the identifying information acquired from the map information DB 31 whether the point set as the destination is a specific point (S7, S8). Therefore, it is possible to easily and properly identify whether the point set as the destination is the specific point.

In addition, if it is determined based on the end of the route whether the vehicle has arrived at the destination, it is determined that the vehicle has arrived at the destination when the vehicle is located on the route and within the first determination reference distance (for example, 30 m) from the coordinate of the end of the route (S14, S15). If it is determined based on the position of the destination whether the vehicle has arrived at the destination, it is determined that the vehicle has arrive at the destination when the vehicle is within the second determination reference distance (for example, 200 m) from the positional coordinate of the destination (S15, S17). Therefore, it is possible to appropriately determine based on the distance from the vehicle to the position of the destination or the distance from the vehicle to the end of the route whether the vehicle has arrived at the destination. As a result, it is possible to properly determine whether the vehicle has arrived at the destination, independently of the size of the destination and the road shape in the vicinity.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, in the present example, a case in which a facility is set as the destination is utilized. However, any point other than a facility may be set as the destination. In such case, identifying information for identifying whether the point is a specific point by area may be previously stored in a DB. It is preferable that it is determined that the point set as the destination is a specific point if the area including the point set as the destination corresponds to the specific point in the identifying information.

In addition, in the present example, the identifying information for identifying whether each of the points in the map information DB31 corresponds to the specific point is stored, and the navigation ECU 13 determines whether the point set as the destination is the specific point based on the identifying information. However, the determination may be made without the identifying information. In such case, it is preferable to determine based on the genre of the point set as the destination, the road shape in the vicinity of the destination, guidance sign posts installed in the vicinity of the destination. In addition, whether a point corresponds to the specific point may be previously set for each genre of the point.

In addition, the broad inventive principles described herein may be applied to devices including a function to perform route guidance based on the guidance route besides the navigation device. For example, the inventive principles may be applied to portable terminals such as cellular phones, PDAs, and the like, personal computers, portable music players, and the like (hereinafter referred to as "portable terminals or the like"). In addition, the inventive principles may be applied to systems composed of servers and portable terminals or the like. In such case, the respective steps of the aforementioned route search processing program (refer to FIG. 3) and the destination arrival determination processing program (refer to FIG. 7) may be executed either a server or a portable terminal or the like. In addition, if the inventive principles are applied to the portable terminals or the like, travel guidance for movable bodies other than vehicles, for example, users of portable terminals or the like, two wheels, and the like may be performed.

What is claimed is:

1. A travel guidance system comprising:
  a controller configured to:
    set a route from a departure point toward destination, the route ending at an ending positional coordinate prior to the destination;
    acquire a position of a movable body moving along the route; and
    determine whether the movable body will be considered to have arrived at the destination based on the acquired position of the movable body by:
      acquiring a distance from the ending positional coordinate to the destination;
      when the acquired distance is less than a predetermined distance, determining based on the ending positional coordinate whether the movable body has arrived at the destination;
      when the acquired distance is equal to or more than the predetermined distance and the destination is a specific point, determining based on the ending positional coordinate whether the movable body has arrived at the destination, wherein the destination is considered to be a specific point when the movable body will be able to navigate from the ending positional coordinate to the destination without any guidance being provided from the ending positional coordinate to the destination; and
      when the acquired distance is equal to or more than the predetermined distance and the destination is not a specific point, determining based on a position of the destination whether the movable body has arrived at the destination.

2. The travel guidance system according to claim 1, wherein the controller is configured to:
  acquire identifying information identifying whether the destination is a specific point; and
  determine based on the identifying information whether the movable body has arrived at the destination.

3. The travel guidance system according to claim 1, wherein the controller is configured to:
  when determining based on the ending positional coordinate whether the movable body has arrived at the destination, determine that the movable body has arrived at the destination if the movable body is located on the route and within a reference distance from the ending positional coordinate.

4. The travel guidance system according to claim 1, wherein the controller is configured to:
  when determining based on a position of the destination whether the movable body has arrived at the destination, determine that the movable body has arrived at the destination if the movable body is located within a reference distance from a positional coordinate of the destination.

5. A navigation device comprising the route guidance system of claim 1, wherein the moving body is a vehicle in which the navigation device is installed.

6. A travel guidance method comprising:
  Setting, with a CPU, a route from a departure point toward destination, the route ending at an ending positional coordinate prior to the destination;
  acquiring, with the CPU, a position of a movable body moving along the route; and
  determining, with the CPU, whether the movable body will be considered to have has arrived at the destination based on the acquired position of the movable body by:
    acquiring, with the CPU, a distance from the ending positional coordinate to the destination;
    when the acquired distance is less than a predetermined distance, determining, with the CPU, whether the movable body has arrived at the destination based on the ending positional coordinate;
    when the acquired distance is equal to or more than the predetermined distance and the destination is a specific point, determining, with the CPU, whether the movable body has arrived at the destination based on the ending positional coordinate, wherein the destination is considered to be a specific point when the movable body will be able to navigate from the ending positional coordinate to the destination without any guidance being provided from the ending positional coordinate to the destination; and
    when the acquired distance is equal to or more than the predetermined distance and the destination is not a specific point, determining, with the CPU, whether the movable body has arrived at the destination based on a position of the destination.

7. The travel guidance method according to claim 6, further comprising:
  acquiring, with the CPU, identifying information identifying whether the destination is a specific point; and determining, with the CPU, based on the identifying information whether the movable body has arrived at the destination.

8. The travel guidance method according to claim 6, further comprising:

when determining based on the ending positional coordinate whether the movable body has arrived at the destination, determining, with the CPU, that the movable body has arrived at the destination if the movable body is located on the route and within a reference distance from the ending positional coordinate.

9. The travel guidance method according to claim 6, further comprising:

when determining based on a position of the destination whether the movable body has arrived at the destination, determining, with the CPU, that the movable body has arrived at the destination if the movable body is located within a reference distance from a positional coordinate of the destination.

10. A non-transitory computer-readable storage medium storing a computer-executable travel guidance program, the program comprising:

instructions for setting a route from a departure point toward destination, the route ending at an ending positional coordinate prior to the destination;

instructions for acquiring a position of a movable body moving along the route; and determining whether the movable body will be considered to have arrived at the destination based on the acquired position of the movable body, including:

instructions for acquiring a distance from the ending positional coordinate to the destination;

instructions for, when the acquired distance is less than a predetermined distance, determining based on the ending positional coordinate whether the movable body has arrived at the destination;

instructions for, when the acquired distance is equal to or more than the predetermined distance and the destination is a specific point, determining based on the ending positional coordinate whether the movable body has arrived at the destination, wherein the destination is considered to be a specific point when the movable body will be able to navigate from the ending positional coordinate to the destination without any guidance being provided from the ending positional coordinate to the destination; and instructions for, when the acquired distance is equal to or more than the predetermined distance and the destination is not a specific point, determining based on a position of the destination whether the movable body has arrived at the destination.

11. The non-transitory computer-readable storage medium according to claim 10, the program further comprising:

instructions for acquiring identifying information identifying whether the destination is a specific point; and instructions for determining based on the identifying information whether the movable body has arrived at the destination.

12. The non-transitory computer-readable storage medium according to claim 10, the program further comprising:

instructions for, when determining based on the ending positional coordinate whether the movable body has arrived at the destination, determining that the movable body has arrived at the destination if the movable body is located on the route and within a reference distance from the ending positional coordinate.

13. The non-transitory computer-readable storage medium according to claim 10, the program further comprising:

instructions for, when determining based on a position of the destination whether the movable body has arrived at the destination, determining that the movable body has arrived at the destination if the movable body is located within a reference distance from a positional coordinate of the destination.

* * * * *